(12) United States Patent
Kotalwar et al.

(10) Patent No.: US 9,401,859 B2
(45) Date of Patent: Jul. 26, 2016

(54) METHOD TO SETUP PROTOCOL INDEPENDENT MULTICAST TREES IN THE PRESENCE OF UNIDIRECTIONAL TUNNELS

(71) Applicants: Jayant Kotalwar, Cupertino, CA (US); Siva Kollipara, Sunnyvale, CA (US)

(72) Inventors: Jayant Kotalwar, Cupertino, CA (US); Siva Kollipara, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 250 days.

(21) Appl. No.: 13/747,956

(22) Filed: Jan. 23, 2013

(65) Prior Publication Data

US 2014/0204939 A1    Jul. 24, 2014

(51) Int. Cl.
*H04L 12/753* (2013.01)
*H04L 12/18* (2006.01)
*H04L 12/707* (2013.01)
*H04L 12/761* (2013.01)
*H04L 12/721* (2013.01)

(52) U.S. Cl.
CPC .............. *H04L 45/48* (2013.01); *H04L 12/185* (2013.01); *H04L 45/22* (2013.01); *H04L 45/16* (2013.01); *H04L 45/34* (2013.01)

(58) Field of Classification Search
None
See application file for complete search history.

(56) References Cited

U.S. PATENT DOCUMENTS

2006/0221962 A1* 10/2006 Previdi et al. ................. 370/390
2009/0135820 A1   5/2009 Suzuki
2010/0054245 A1*  3/2010 Asati et al. .................... 370/390
2011/0051727 A1*  3/2011 Cai et al. ....................... 370/390
2011/0305239 A1* 12/2011 Chandrashekharachar Suvarneshwar .............. 370/390

OTHER PUBLICATIONS

Notification of Transmittal of the International Search Report and the Written Opinion of the International Searching Authority, or the Declaration issued in International Application No. PCT/US2014/02162 mailed Mar. 27, 2014.
Naiming, Shen, Nexthop Fast Reroute for IP and MPLS: draft-shen-nhop-fastreroute-01.txt, Redback Networks; Ping Pan-Ciena Corp.; No. 1, XP015035233, ISSN: 0000-0004 paragraphs [003.], [04.6], [05,1], Jul. 1, 2004.
Wijnands, I.J., "The Reverse Path Forwarding (RPF) Vctor TLV; rfc5496.text", The Reverse Path Forarding (RPF) Vector TLV; RFC5496.TXT. Internet Engineering Task Forcr, IETF, Standard, Internet Society (ISOC) 4, Rue Des Falaises CH-1206 Geneva Switzerland; XP015065534, Retrieved on Mar. 27, 2009.
Yuksel, M. et al., "Cross-Layer Techniques for Failure Restoration of IP Multicast With Applications to IPTV", Communication Systems and Networks (CONSNETS), 2010 Second International Conference on, IEE, Piscataway, NJ, USA; ISBN: 978-1-4244-5487-7, Jan. 5, 2010.
A. Boers, I. Wijnands, E. Rosen, The Protocol Independent Multicast (PIM) Join Attribute Format, Cisco Systemsl, Inc, Nov. 2008, pp. 1-11.
IJ. Wijnands, A. Boers, E. Rosen, The Reverse Path Forwarding (RPF) Vector TLV, Cisco Systemsl, Inc, Mar. 2009, pp. 1-9.

* cited by examiner

*Primary Examiner* — Hicham Foud
(74) *Attorney, Agent, or Firm* — Kramer & Amado, P.C.

(57) ABSTRACT

Embodiments of the invention are directed to establishing a PIM tree to a source that is reachable over a unicast tunnel in a packet switched network. Advantageously, a Reverse Path Forwarding (RPF) Vector TLV to establish a PIM tree may be used in cases where there is an absence of source reachability in the core of a network.

8 Claims, 4 Drawing Sheets

METHOD TO SETUP PROTOCOL INDEPENDENT MULTICAST TREES IN THE PRESENCE OF UNIDIRECTIONAL TUNNELS

FIELD OF THE INVENTION

The invention is directed to multicasting in a tunneled network.

BACKGROUND

Protocol Independent Multicast (PIM) is a collection of multicast routing protocols. One of the main PIM protocols is PIM Sparse Mode (PIM-SM). PIM-SM is suited for a multicast group that will be sparsely distributed throughout a network. To receive multicast data using PIM-SM, a router must send to its upstream neighboring routers a request to join particular groups and sources. Routers use PIM Join messages to join multicast distribution trees and PIM Prune messages to leave them.

PIM-SM supports the use of source-based trees, in which a separate multicast distribution tree is built for each source that sends data to a multicast group. Each source-based tree is rooted at a router adjacent to the source, which sends data directly to the root of the tree. Source-based trees enable the use of Source Specific Multicast (SSM). With SSM, a host identifies a multicast data stream in a Join message by a source (S) and group (G) address pair (S, G).

A problem may occur when setting up a source-based tree if the next hop to reach the source of the multicast tree is reachable via a unidirectional tunnel. This may occur when part of the path between a host requesting an SSM Join and the source specified in the Join message is over an Interior Gateway Protocol (IGP) shortcut. For example, the next hop could be a router at the far-end of a unidirectional tunnel. In that case, PIM would not be able to establish the tree because it could not setup a neighboring relationship with the router at the next hop address since for that PIM would need a bi-directional tunnel.

One solution to the first aforementioned problem is to let the IGP protocols such as Open Shortest Path First (OSPF) and Intermediate System to Intermediate System (ISIS) completely resolve the IGP shortcut route and provide the immediate next hop. However, this solution will not work if the core of the network does not have a route to reach the source of the multicast tree. In cases where such a route does exists, the solution should work but it would disadvantageously use resources that may already be in critical demand such as those that perform path calculations for the IGP protocols.

Therefore, an efficient and reliable way of establishing source-based multicast trees is desired.

SUMMARY

Embodiments of the invention enable a PIM multicast tree to be established through unidirectional tunnel endpoint nodes. The nodes of the multicast tree may or may not overlap with the nodes of the unidirectional tunnel.

According to an aspect of the invention a method of establishing a PIM multicast tree in a tunneled network is provided. The method comprises, at a first node in the network, receiving a join message that indicates a source node of a multicast group; looking up a route to the source node; determining if the first node has an adjacency with a first next hop node along the route; and forwarding the join message to the first next hop node responsive to the first node having an adjacency with the first next hop node. The step of determining if the first node has an adjacency with the first next hop node along the route may include determining that the route uses a unicast tunnel.

Additionally the method may comprise, responsive to the first node using a unicast tunnel route and not having an adjacency with the first next hop node, performing a recursive next hop resolution of the first next hop node to find a second next hop on an alternate route to the source node through the first next hop node; and forwarding, responsive to finding the alternate route and having an adjacency with that second next hop, the join message to the second next hop node. Additionally, the method may comprise, depending on node configuration and/or responsive to the action of performing recursive next hop resolution altering the join message to include a reverse path forwarding vector that indicates the first next hop node; and forwarding the altered join message to the second next hop node that was found when performing the recursive next hop resolution of the first next hop node. The step of performing the recursive next hop resolution may include finding an alternate route that does not use the tunnel.

According to another aspect of the invention a network node is provided. The network node comprises: an interface for receiving and transmitting data packet traffic; a processor coupled to the interface; a memory coupled to the processor, the memory including routing information; and a program of computer readable instructions stored in the memory. When the program is executed by the processor it causes the network node to be operable to: receive via the interface a join message that indicates a source node of a multicast group; look up in the memory a route to the source node; determine if the first node has an adjacency with a first next hop node along the route; and forward the join message to the first next hop node responsive to the first node having an adjacency with the first next hop node. The function of determining if the first node has an adjacency with the first next hop node along the route may include determining that the route uses a unicast tunnel.

Additionally, when the program is executed by the processor it may further cause the network node to be operable to, responsive to the first node using a unicast tunnel route and not having an adjacency with the first next hop node, perform a recursive next hop resolution of the first next hop node to find a second next hop on an indirect alternate route to the source node through the first next hop node; and forward, responsive to finding the alternate route and having an adjacency with that second next hop, the join message to the second next hop. Additionally, when the program is executed by the processor it may further cause the network node to be operable to, depending on node configuration and/or responsive to the action of performing recursive next hop resolutions, alter the join message to include a reverse path forwarding vector that indicates the first next hop node; and forward the altered join message to the second next hop node that was found when performing the recursive next hop resolution of the first next hop node. The function of performing the recursive next hop resolution may include finding an alternate route that does not use the tunnel.

According to yet another aspect of the invention a network is provided. The network comprises a first network node, a second network node and a third network node. The first network node is adapted to receive a join message that indicates a source node of a multicast group, look up a route to the source node, determine if the first network node has an adjacency with a first next hop node along the route, else perform a recursive next hop resolution of the first next hop node to find an indirect alternate route to the source node, alter the join message to include a reverse path forwarding vector that indicates the first next hop node, and forward the altered join message toward the source node. The second network node is adapted to receive the altered join message that includes the reverse path forwarding vector, perform a next hop resolution of the reverse path forwarding vector instead of the source, and forward the join message toward a third next hop that was found when performing the next hop resolution. The third network node is adapted to receive the altered join message that includes the reverse path forwarding vector and determine that the vector is itself and update the join message by removing the reverse path forwarding vector, and forward the updated join message toward the source node.

Advantageously, embodiments of the invention enable a PIM multicast tree to be setup over network routes that also carry a unidirectional tunnel, as may exist in a network that has IGP shortcuts enabled.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

A mechanism that can be used to establish a PIM tree to a source that is reachable over a unicast tunnel in a network will be described. Unicast transmission, such as that used by a unicast tunnel, is transmission of a message or datagram from one network node to another single network node, i.e. one-to-one transmission, and hereinafter should be understood to be unidirectional. The use of a Reverse Path Forwarding (RPF) Vector Type Length Value (TLV) parameter to establish a PIM tree will also be described for cases where there is an absence of source reachability in the core of a network. The RPF Vector TLV is defined in RFC5496.

Figure 1:
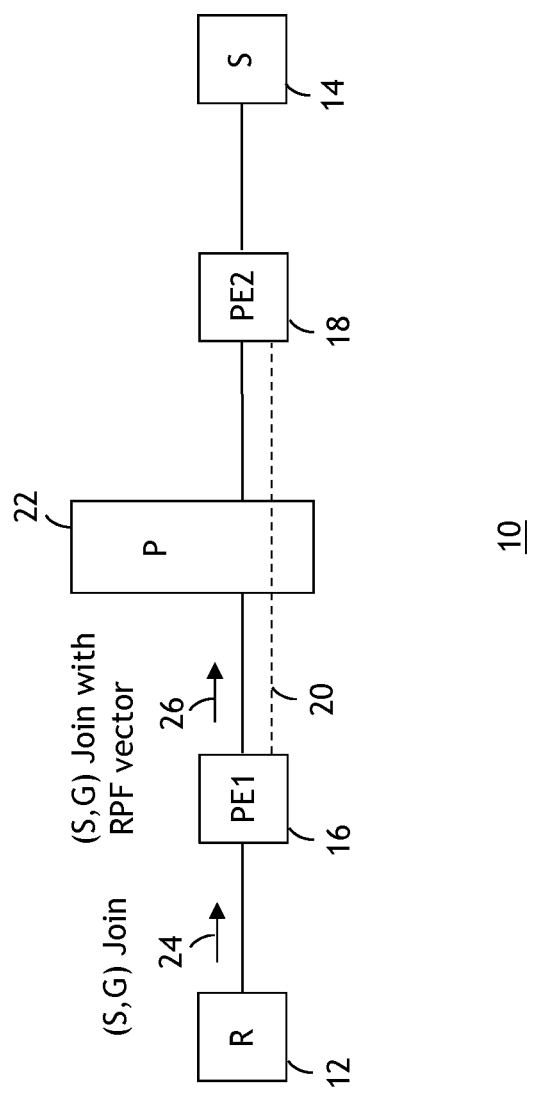
FIG. 1 depicts a network according to a first embodiment of the invention.

FIG. 1 depicts a network 10 according to a first embodiment of the invention. The network 10 includes a host node 12, also referred to herein as a receiver (R), which is to join a multicast group (G) sourced by a source node 14. The host node 12 is connected to a first provider edge (PE) router (PE1) 16. A second PE router (PE2) 18 is reachable by the first PE router 16 via a unicast tunnel 20. The second PE router 18 is connected to the source node (S) 14. A third router (P) 22 is connected to both the first and second PE routers 16, 18 such that it is in an intermediate position along the tunnel 20 between the first and second PE routers 16, 18.

The term connected is used herein to mean directly coupled by a physical communications link to the network node in question such that data packets can be bi-directionally communicated between the two network nodes described as being so connected. The term reachability is used herein to refer generally to a route or information about a route for forwarding data packets from the present network node to another specified network node.

In some network topologies the reachability to a multicast source is over a unicast tunnel such as an IGP shortcut or a BGP tunnel, e.g. the source node 14 is reachable by the first PE router 16 via the unicast tunnel 20. For such routes, the next hop to reach the source from a router at the near end of the tunnel would be the tunnel endpoint at the far end of the tunnel, e.g. the second PE router 18 would be the next hop from the first PE router 16 using the tunnel 20. However, because communication carried by the tunnel is unidirectional a PIM adjacency with the next hop 18 cannot be established over the tunnel. Consequently, an attempt to setup a PIM tree using the tunnel would fail. For example, an attempt by the first PE router 16 to establish a PIM tree using the tunnel 20 would fail because the first PE router 16 does not have an adjacency with the second PE router 18.

Embodiments of the invention provide a mechanism to build a PIM tree to a source reachable via a unicast tunnel. This mechanism relies on recursive next hop lookup to reach a next hop network node in a direction towards a multicast source node. For cases where a next hop network node does not have reachability to a desired multicast source node, which would result in the next hop network node not being able to propagate PIM join messages towards the multicast source node, an additional mechanism is described that uses an RPF Vector TLV to help build the PIM tree.

Referring to FIG. 1, PIM is enabled at the first and second PE routers 16, 18 and the third router 22. The first and second PE routers 16, 18 each have respective PIM adjacency with the third router 22. The third router 22 also has PIM adjacency with the first and second PE routers 16, 18. However, the first and second PE routers 16, 18 do not have PIM adjacency with each other. At the host node 12, the next hop to reach the source node 14 is the first PE router 16. At the first PE router 16, the next hop to reach the source node 14 is the second PE router 18 using the route provided by the unicast tunnel 20.

In order to build a multicast distribution tree, PIM join messages are forwarded hop-by-hop by routers in the path of the tree towards the source of the multicast group. The router at each hop creates a forwarding state and propagates the join message towards the source. For example referring to FIG. 1, the host node 12 would send an (S, G) join message 24 to the first PE router 16. The first PE router 16 forwards the (S, G) join message 24 to the next hop router, which is the second PE router 18. However, in this case since the first PE router 16 does not have an adjacency with the next hop router (i.e. the second PE router 18); the next hop router will not propagate the join message 24 towards the source node 14.

An existing solution to the aforementioned problem is to let the IGP protocols like OSPF and ISIS completely resolve the IGP shortcut route and provide the immediate next hop. However, that solution presents at least two problems: it adds overhead to critical resources such as those used for shortest path first (SPF) calculation made by the IGP protocols, and it will not work if the core of the network does not have the route to reach the source of the multicast tree.

Embodiments of the invention cause PIM to recurse on the next hop and determine another immediate next hop with which it has an adjacency. That is, the router that is trying to forward the (S, G) Join message will perform a recursive next hop resolution on the IP address of the next hop router to find another router with which it has adjacency and that is in a path to the next hop router. Thus, referring to FIG. 1, the first PE router 16 would determine that to reach source node 14, it has to recurse over the next hop, which is the second PE router 18. This recursion will yield the third router 22 as the final next hop with which the first PE router 16 has an adjacency. Thus, the first PE router 16 can propagate the (S, G) join message 24 to the third router 22 and expect the third router 22 to propagate the join message 24 further upstream toward the source node 14.

Another problem can manifest if the third router 22 does not have reachability to the source node 14. In this case, the third router 22 would just drop the (S, G) join message 24 without propagating it forward toward the source node 14. To address that problem, another mechanism is provided herein. Specifically, since the first PE router 16 performed a recursive next hop resolution on the second PE router 18, the first PE router 16 could originate a PIM (S, G) join message 26 that includes an RPF Vector attribute encoded with the address of the second PE router 18. The RPF vector attribute would therefore provide an indication to the third router 22 as to where the join message 26 should be propagated. The RPF vector attributes would preferably conform to the rules of RFC5496 and RFC5384.

As an example, suppose the host node 12 sends a (S, G) join message 24 to the first PE router 16. After receiving the join, the first PE router 16 looks up the routing table to find a route towards the source node 14. The route provided by the routing table is a tunnel route with a next hop of the second PE router 18 over the unicast tunnel 20. PIM cannot mark the next hop as valid because it will not have an adjacency with router second PE router 18. Note that the tunnel 20 is a unidirectional tunnel. For the adjacency to setup, a bidirectional tunnel is needed. Given that the route is tunneled, PIM on the first PE router 16 will recurse on the next hop to look for a route to reach the next hop (the second PE route 18). The new route to reach the second PE route 18 will have a next hop of the third router 22. It will be a directly connected next hop and PIM will find adjacency with the immediate next hop (the third router 22). The first PE router 16 will then originate a join message 26 to the third router 22. If the topology is such that the core network (in this case the three routers 16, 18, and 22) does not contain a route to the source node 14, the first PE router 16 will then originate a (S, G) Join message 26 for the source (S) and group (G) with an RPF vector encoded in it. The RPF vector will have the IP address of the second PE router 18 encoded in it. The RPF vector will provide an indication to the third router 22 that it must send a join message towards the second PE router 18 to reach the source node 14. The PIM join message 26 will travel hop by hop towards source node 14 and multicast traffic will start flowing from the source node 14 to the host node 12.

In summary, if the route to reach a source S of a PIM tree from a present router is over a unicast tunnel, such that the next hop is only reachable over the tunnel then PIM will recurse the next hop address and get a route to reach the next hop that does not use the tunnel. A new next hop for the route will be determined by the present router and that new next hop will be an immediate hop with which PIM on the present router has a neighboring relationship. The present router will then originate a PIM Join message for the source S and send it to the new next hop. Additionally, if the new next hop is a core router and the topology of the network is such that the core router does not have a route to the source S, an RPF vector attribute encoded with the address of the next hop may be included in the PIM join message. The RPF vector attribute will provide an indication or hint to the core router as to where the join message should be propagated. The PIM join message will travel hop by hop towards the source S, which upon receiving the join message will cause multicast traffic to start flowing from the source S to the receiver R.

Figure 2:
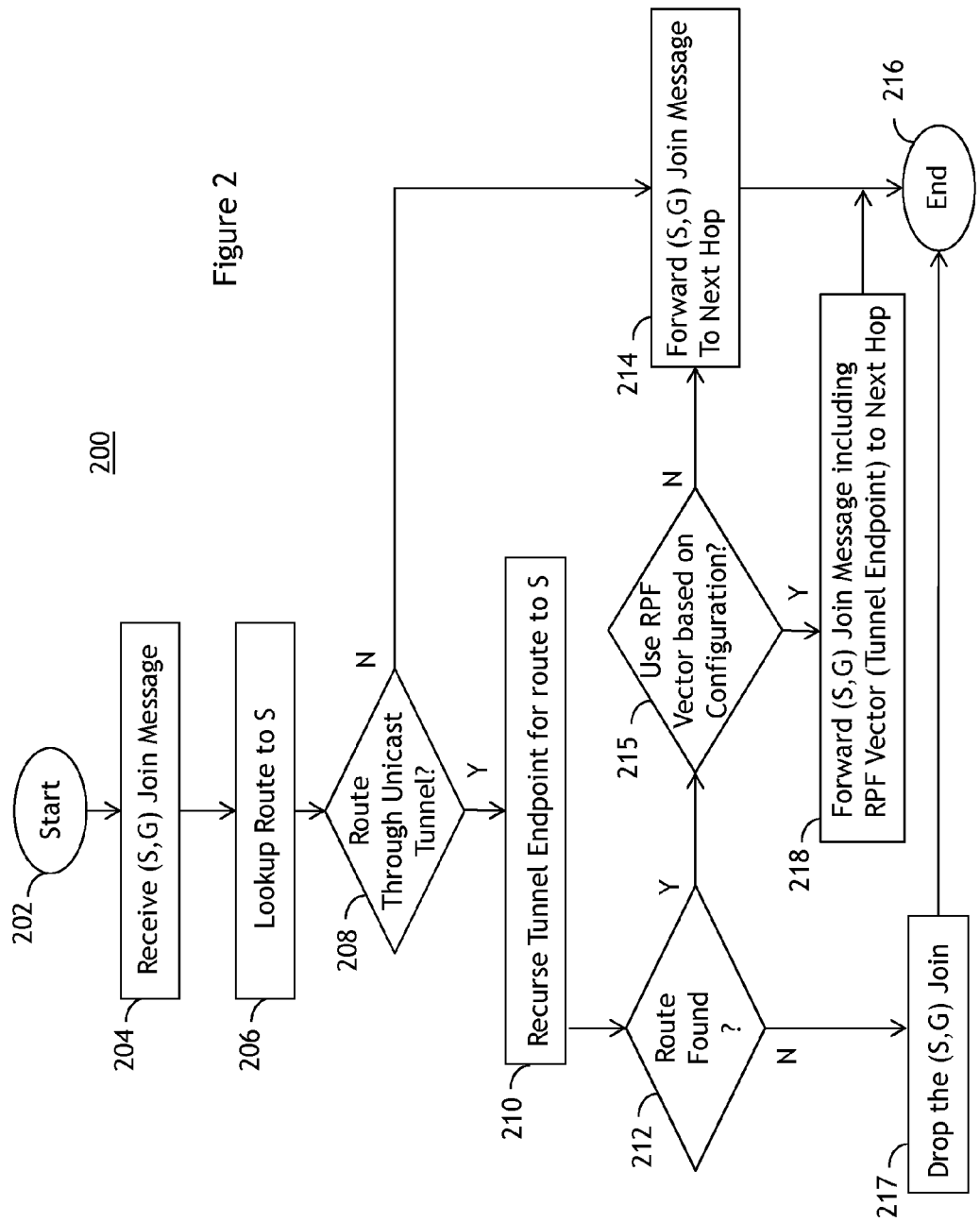
FIG. 2 depicts a method of establishing a PIM tree according to a second embodiment of the invention.

FIG. 2 depicts a method 200 of establishing a PIM tree according to a second embodiment of the invention. The method 200 would be executed on one or more routers in a packet switched network such as the routers 16, 18, 22 shown in FIG. 1. According to the method 200, after starting 202 the next step is receiving 204 an (S, G) join message such as either of the messages 24, 26 shown in FIG. 1. The router that is executing the method 200 then proceeds by looking up 206 a route to the source S indicated in the received (S, G) join message. The router would typically use the IP address of the source S to look up the route to the source S in the router's routing table. The next step of the method 200 is then to determine 208 if the route found by the lookup is through a unicast tunnel, or any other route such that the router does not have an adjacency relationship with the next hop along the route. If the router determines that the route is not through a unicast tunnel and is along a route where the router has an adjacency with the next hop, then the next step of the method 200 is to forward 214 a (S, G) join message to the next hop along the route after which the method 200 being executed by the router ends 216.

However, if the router determines 208 that the route is through a unicast tunnel or along a route where the router does not have an adjacency with the next hop, then the next step of the method 200 is to recurse 210 the tunnel endpoint, or the next hop as the case may be. To recurse 210 the tunnel endpoint (or next hop) means to perform a recursive next hop resolution of the IP address of the tunnel endpoint (or next hop) to find an indirect alternate route to the source S through the tunnel endpoint that does not use the tunnel. It should be noted that the alternate route may traverse some or all of the same routers or network nodes that the tunnel traverses. However, the routing of data packets, including those carrying join messages, over the alternate route will not be done in the same way as it would have been had the data packets been routed via the tunnel.

If the router determines 212 that such an alternate route has been found, the next step of the method 200 is to determine 215 whether to send a RPF vector based on node configuration and/or responsive to the action of performing recursive next hop resolutions. In case of configurations where the core of the network does not have reachability to the source nodes, the network operator should configure the node to enable PIM RPF vectors. If an RPF vector is not to be used the method proceeds to forwarding 214 the (S, G) join message to the next hop. Otherwise, the next step is to forward 218 a (S, G) join message that includes an RPF vector indicating the IP address of the tunnel endpoint to a new next hop network node found by the recurse operation, after which the method 200 ends 216. If the router determines 212 that an alternate route is not found the (S, G) join message is dropped 217, after which the method 200 being executed on the router ends 216.

It should be noted that after the router forwards 218 the (S, G) join message 26 that includes the RPF vector, another router that receives that message 26 may also perform a recursive route lookup of the network node indicated by the RPF vector (e.g. the tunnel endpoint). Furthermore, that other router may formulate a second (S, G) join message that includes a second RPF vector that indicates another network node and forward that second (S, G) join message towards the source S.

It should also be noted that optionally the steps of determining 212 if a route has been found by the recursing 210 operation and the step of forwarding 214 a (S, G) join message 24 that does not include an RPF vector could be omitted, and the step of forwarding 216 a (S, G) join message 26 that includes an RPF vector (as described) could be performed in every case instead.

Figure 3:
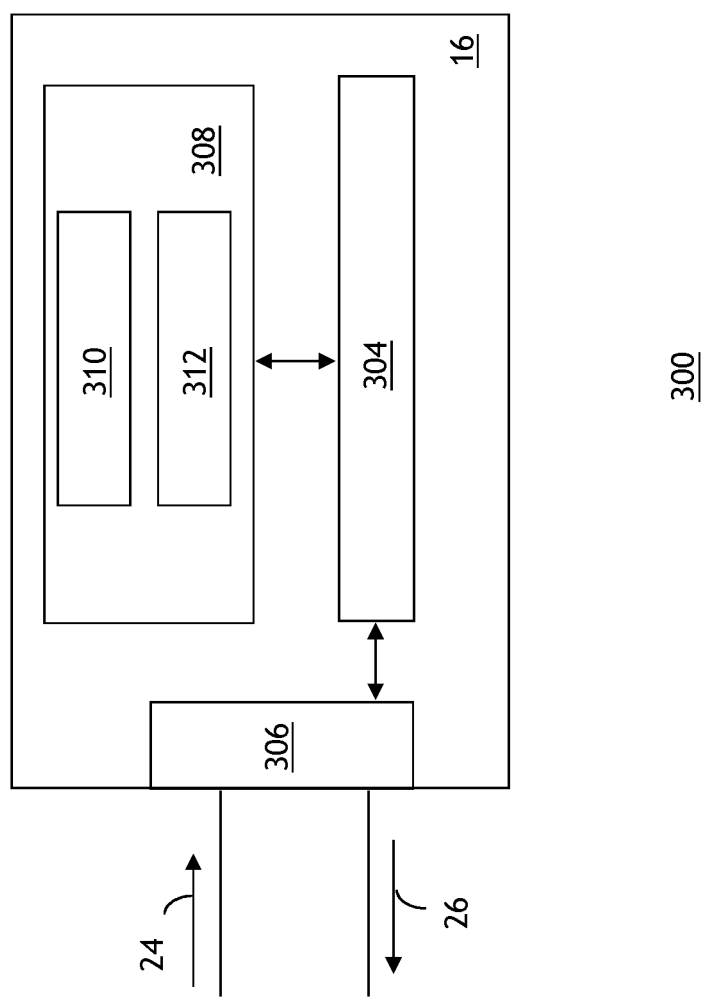
FIG. 3 depicts the architecture of a first provider edge router in FIG. 1 according to a third embodiment of the invention.

FIG. 3 depicts the architecture 300 of the first PE router 16 in FIG. 1 according to a third embodiment of the invention.

The architecture 300 of the first PE router 16 is such that it can load, or otherwise be adapted with, a software program that includes machine executable instructions that when executed cause the first PE router 16 to perform a method of establishing a PIM tree, such as the method 200 previously described with reference to FIG. 2.

Referring to FIG. 3, the first PE router 16 includes a processor 304 communicatively coupled to a memory 308 so as to enable the processor 304 to be able to read data from the memory 308 and write data to the memory 308. The data could take the form of program instructions 310, routing information 312, and data packets among other things. The program 310 includes computer readable instructions that when accessed and executed by the processor 304 cause the first PE router 16 to perform a method of establishing a PIM tree, such as the method 200 previously described with reference to FIG. 2. The first PE router 16 also includes an interface 306 for receiving and transmitting data packet traffic such as that which would include the PIM join messages 24, 26 previously mentioned, as well as multicast data that would be communicated via the PIM tree as well as other types of data. The interface 306 is communicatively coupled to the processor 304 so as to enable the processor 304 to receive the data packet traffic or information contained therein from the interface 306, and to transmit traffic or information to be contained therein to the interface 306. With respect to the foregoing example, the host node 12 and the third router 22 would be connected to the interface 306 as well as other routers or network nodes as the case may be.

Figure 4:
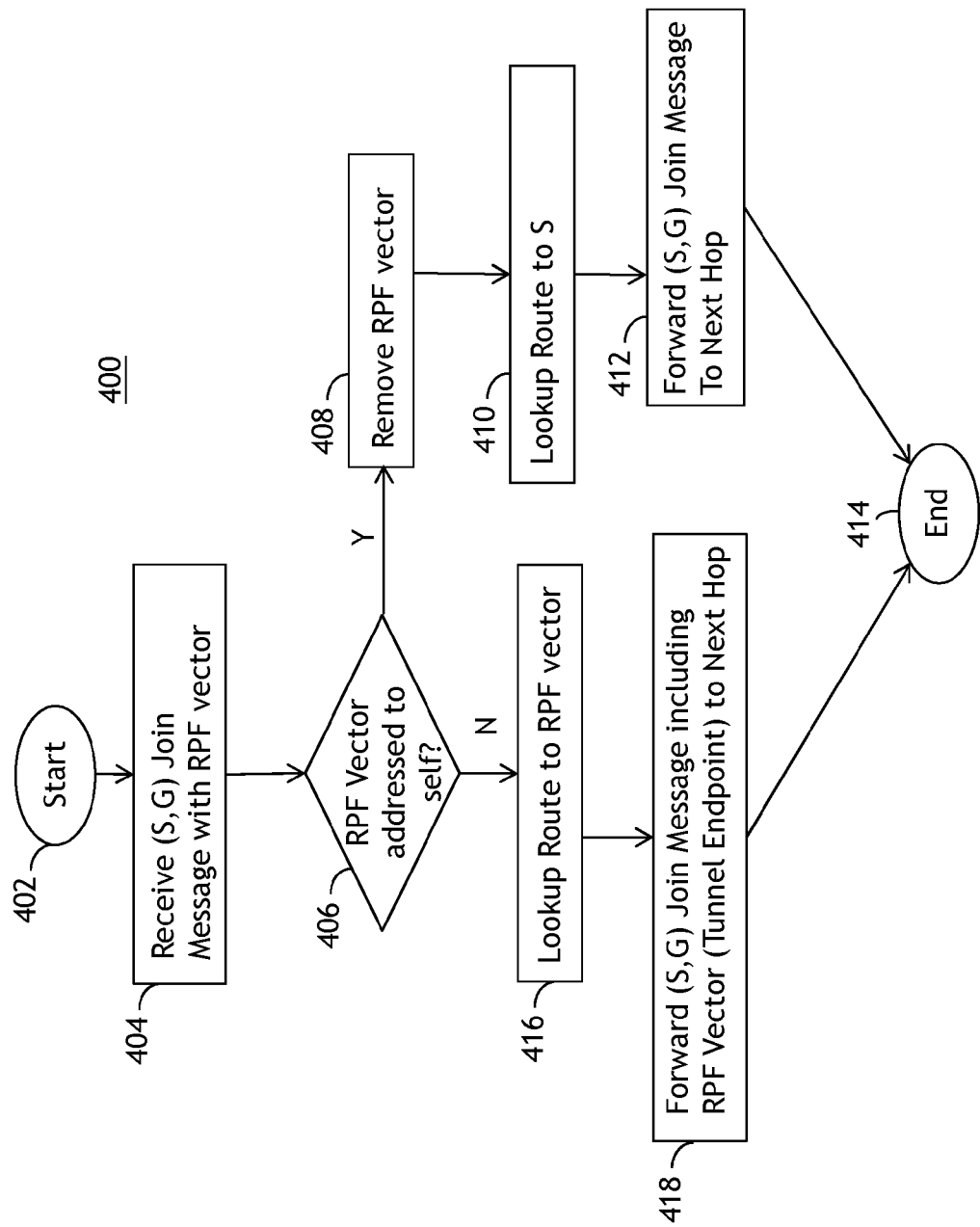
FIG. 4 depicts a method of establishing a PIM tree according to a fourth embodiment of the invention.

FIG. 4 depicts a method 400 of establishing a PIM tree according to a fourth embodiment of the invention. The method 400 would be executed on one or more routers in a packet switched network such as the routers 18 and 22 shown in FIG. 1. According to the method 400, after starting 402 the next step is receiving 404 an (S, G) join message that includes an RPF vector such as the altered join message 26 shown in FIG. 1. The router that is executing the method 400 then proceeds by determining 406 if the RPF vector is addressed to the router itself. For example, if the RPF vector specified the router's IP address then the router would determine that the RPF vector is addressed to itself, in which case the router would remove 408 the RPF vector from the (S, G) join message 26. The router would then lookup 410 a route to the source S and forward 412 the (S, G) join message [with the RPF vector now removed] to the next hop node along the route to the source S. After which the method 400 would end 414. However, if the router determines that the RPF vector is not addressed to the router itself, then the router proceeds to lookup 416 a route to the node addressed by the RPF vector. The router then forwards 418 the (S, G) join message 26 [which includes the RPF vector] to the next hop node along the route resulting from the lookup 416, after which the method 400 ends 414.

Advantageously, embodiments of the invention enable a PIM multicast tree to be established to a multicast source in cases where reachability to the multicast source from a router that is attempting to setup the tree is over a unicast tunnel such as an IGP shortcut or a BGP tunnel.

Numerous modifications, variations and adaptations may be made to the embodiments of the invention described above without departing from the scope of the invention, which is defined in the claims.

What is claimed is:

1. A method of establishing a protocol independent multicast tree in a packet switched network, the method comprising:
   at a first node in the network,
      receiving a join message that indicates a source node of a multicast group;
      looking up a route to the source node;
      determining if the first node has an adjacency with a first next hop node along the route;
      forwarding the join message to the first next hop node responsive to the first node having an adjacency with the first next hop node;
   responsive to the first node not having an adjacency with the first next hop node:
      performing a recursive next hop resolution of the first next hop node to find a second next hop on an alternate route to the source node through the first next hop node;
      responsive to not finding the alternate route:
         dropping the join message; and
      responsive to finding the alternate route and having an adjacency with the second next hop:
         forwarding the join message to the second next hop node.

2. The method of claim 1 further comprising based on the first node configuration and responsive to action of performing recursive next hop resolutions:
   altering the join message to include a reverse path forwarding vector that indicates the first next hop node; and
   forwarding the altered join message to the second next hop node that was found when performing the recursive next hop resolution of the first next hop node.

3. The method of claim 2 further comprising:
   at the second next hop node,
      receiving the altered join message;
      performing a next hop resolution of the reverse path forwarding vector; and
      forwarding the altered join message to a third next hop node that was found when performing the next hop resolution.

4. The method of claim 1 wherein performing further comprises finding an alternate route that does not use a tunnel.

5. The method of claim 1 wherein receiving a join message further comprises receiving a source specific multicast join message.

6. The method of claim 1 further comprising:
   at the source node,
      receiving the join message and adding an originating node of the join message to the multicast group.

7. A network node comprising;
   an interface for receiving and transmitting data packet traffic;
   a processor coupled to the interface;
   a memory coupled to the processor, the memory including routing information;
   a program of computer readable instructions stored in the memory that when executed by the processor cause the network node be operable to:
   receive via the interface a on message that indicates a source node of a multicast group;
   look up in the memory a route to the source node;
   determine if the network node has an adjacency with a first next hop node along the route; and
   forward the join message to the first next hop node responsive to the network node having an adjacency with the first next hop node;
   responsive to the network node not having an adjacency with the first next hop node:
   perform a recursive next hop resolution of the first next hop node to find a second next hop on an alternate route to the source node through the first next hop node;

responsive to not finding the alternate route:
drop the join message; and
responsive to finding the alternate route and having an adjacency with the second next hop:
forward the join message to the second next hop node.

8. The network node of claim 7 wherein the program when executed by the processor further causes the network node be operable to:
based on node configuration or responsive to the action of performing recursive next hop resolution,
alter the join message to include a reverse path forwarding vector that indicates the first next hop node; and
forward the altered join message to the second next hop node that was found when performing the recursive next hop resolution of the first next hop node.

* * * * *